United States Patent
Tanaka

(10) Patent No.: US 8,991,237 B2
(45) Date of Patent: Mar. 31, 2015

(54) METHOD OF TESTING AIR TIGHTNESS OF SEALED LASH ADJUSTER

(75) Inventor: Akifumi Tanaka, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 466 days.

(21) Appl. No.: 13/505,072

(22) PCT Filed: Jan. 22, 2010

(86) PCT No.: PCT/JP2010/050782
§ 371 (c)(1),
(2), (4) Date: Apr. 30, 2012

(87) PCT Pub. No.: WO2011/089707
PCT Pub. Date: Jul. 28, 2011

(65) Prior Publication Data
US 2012/0210773 A1    Aug. 23, 2012

(51) Int. Cl.
G01M 3/08    (2006.01)
G01M 3/28    (2006.01)
G01M 3/02    (2006.01)
G01M 3/32    (2006.01)

(52) U.S. Cl.
CPC ............ *G01M 3/2869* (2013.01); *G01M 3/025* (2013.01); *G01M 3/3209* (2013.01)
USPC ......................................................... 73/49.7

(58) Field of Classification Search
USPC ........................................ 73/49.3, 49.7, 49.8
See application file for complete search history.

(56) References Cited

U.S. PATENT DOCUMENTS

| | | | | |
|---|---|---|---|---|
| 3,039,300 A | * | 6/1962 | Phillips et al. | 73/114.79 |
| 5,492,006 A | * | 2/1996 | Beckett | 73/114.01 |
| 2008/0223111 A1 | * | 9/2008 | Mc Donald et al. | 73/37 |

FOREIGN PATENT DOCUMENTS

| | | |
|---|---|---|
| JP | 8-184531 A | 7/1996 |
| JP | 2009-091907 A | 4/2009 |

OTHER PUBLICATIONS

International Search Report dated Mar. 16, 2010 for PCT/JP2010/050782.

* cited by examiner

*Primary Examiner* — John Fitzgerald
(74) *Attorney, Agent, or Firm* — Westerman, Hattori, Daniels & Adrian, LLP

(57) ABSTRACT

The method of the present invention comprises the steps of inserting, the plunger having in the side wall thereof a lower open end and an oil recycling hole in the side wall thereof and provided with a seal member, supplying pressurized air to the plunger through a port formed in the top end of the plunger, testing the internal air tightness of the sealed lash adjuster with the lower end of the plunger and with the oil recycling hole closed when the plunger is inserted in the body, opening the oil recycling hole and further inserting the plunger in the body if the seal member is verified to have satisfactory sealability; and testing the internal air tightness of the lash adjuster to test the sealability of the seal member with the seal member and with the oil recycling hole positioned not to reach the seal member.

1 Claim, 4 Drawing Sheets

METHOD OF TESTING AIR TIGHTNESS OF SEALED LASH ADJUSTER

TECHNICAL FIELD

This invention relates to a method of testing air tightness of a sealed lash adjuster, and more particularly to a method of testing the internal air tightness of the lash adjuster (or sealabilty of the seal members installed between the slidable portions of the plunger and the body of the adjuster in contact with each other) during the stage of assembling the lash adjuster.

BACKGROUND ART

There has been known lash adjusters for automatically nullifying or adjusting to substantial zero the valve clearance between the intake/exhaust valves and the cylinder heads of an internal combustion engine. These lash adjusters can be classified into two categories: those that utilize externally supplied oil and those that utilize a liquid such as oil precharged in the plunger.

A known sealed lash adjuster is disclosed in, for example, a patent document listed below.

This sealed lash adjuster includes a plunger having an lower open end and inserted in a cylindrical body having a bottom and an upper open end such that a reservoir formed in the plunger is communicated with a high-pressure chamber provided below the plunger via a check valve provided at the lower end of the plunger. An oil recycling hole for returning the oil from the high-pressure chamber to the reservoir is formed in the side wall of the plunger. In order to prevent engine oil from flowing into the lash adjuster, the lash adjuster is provided with seal means in the form of two seal members installed at two axial locations between the open end of the body and the oil recycling hole, and between the slidable portions of the plunger and body in contact with each other. The lash adjuster is charged with a predetermined amount of oil supplied through an oil injection port formed in the top end of the plunger.

The two seal members, that is, a first seal member provided on the slidable portion of the plunger and a second seal member provided on the slidable portion of the body, are arranged at the two axial locations such that the space between the first and second seal members is expanded when the plunger is pushed into the body, but contracted when the plunger is projected from the body.

In assembling the sealed lash adjuster, the plunger provided with the first seal member is inserted into the body provided with the first seal member, to a predetermined depth where the first seal member of the plunger has passed the second seal member installed on the body.

PRIOR ART DOCUMENT

Patent Document

PATENT DOCUMENT 1: JPA2009-91907 (Paragraphs 0021-0029, and FIGS. 1, 2 and 3)

BRIEF DESCRIPTION OF THE INVENTION

Problem to be Solved

Although the sealed lash adjuster disclosed in Patent Document 1 is a recent sealed lash adjuster, it has an disadvantage in that the performance of the first and second seal members cannot be tested once they are installed in the adjuster, and this is a reason why this adjuster has not been well practiced.

Therefore, there is a need for means for testing the internal air tightness of the assembled lash adjuster (or performance of the first and second seal members) by supplying, for example, pressurized gas into the plunger through the oil injection port formed in the top end of the plunger.

This method can detect defects of the seal members when they are both defective, but cannot detect the defect(s) of the seal member(s if only one of them is defective, nor cannot determine which one is defective.

Therefore, in order to make the sealed lash adjuster of Patent Document 1 to be really practicable, a need exists to provide a new method of testing the performance of the first and second seal members installed in the sealed lash adjuster.

It is, therefore, an object of the present invention to overcome the problem above by providing a method of testing a sealed lash adjuster, capable of determining individual air tightness of the first and second seal members.

Means for Solving the Problem

To achieve the object above there is provided in accordance with Claim 1 a method of testing air tightness of a sealed lash adjuster including: a cylindrical body having an upper open end and a bottom; a cylindrical plunger inserted in the body and having a lower open end and a reservoir formed therein; a check valve, provided at the lower end of the plunger, for communicating the reservoir with a high-pressure chamber provided below the plunger; an oil recycling hole formed in the side wall of the plunger for returning oil from the high pressure chamber to the reservoir; and seal means in the form of a first and a second seal member provided between the slidable portions of the plunger and the body in slidable contact with each other and at two axial locations between the open end of the body and the oil recycling hole, with the first seal member provided on the slidable portion of the plunger and the second seal member provided on the slidable portion of the body, the testing method adapted to test the air tightness of the sealed lash adjuster in the course of assembling the sealed lash adjuster by supplying the plunger with pressurized gas through an oil injection port formed in the top end of the plunger such that the space defined by the first and second seal members is expanded when the plunger is pushed in the body, and that the space is contracted when the plunger is projected from the body, the method characterized by comprising:

a first step of testing the air tightness of the lash adjuster (the step referred to as first test) by closing the oil recycling hole when the lower end of the slidable portion of the plunger inserted in the body has reached a predetermined location where the plunger is in sliding contact with the second seal member; and a second step of testing the air tightness of the lash adjuster (the step referred to as second test) subsequent to the first test if a determination is made in the first test that the lash adjuster has normal air tightness, the second test including a process of opening the oil recycling hole and further inserting the plunger to a predetermined position in the body where the first seal member is in contact with the slidable portion of the body but has not reached the second seal member, and then testing internal air tightness of the lash adjuster.

(Function) With the oil recycling hole of the plunger inserted to a predetermined depth in the body at which the lower end of the slidable portion of the plunger is in contact with the second seal member, the internal air tightness of the lash adjuster (and hence the air tightness of the high-pressure chamber and reservoir) depends solely on the sealability of the second seal member. The first step of the air tightness test is performed under this condition. If the internal air tightness of the lash adjuster is established, it becomes difficult to further inject the gas into the plunger as the pressure of the gas in the lash adjuster has reached the pressure of the injection gas. This can be confirmed by a leak tester, for example, adapted to detect a leak of the injected gas supplied from the oil injection port into the plunger.

If on the other hand the internal air tightness is not established in the first air tightness test, the pressurized gas will be continuously and indefinitely supplied into the plunger, since the pressurized gas continues to leak from the plunger via the slidable contact portions of the body and plunger. This can be confirmed by the leak tester, indicating that the second seal member is defective. If the second seal member is found to be defective in this way in the first test, the plunger is taken out of the body to replace the second seal member with a new one, which is subjected to the first air tightness test.

The first air tightness test will be repeated until a new second seal member is proved to be non-defective in the test.

If in the first test the internal air tightness is verified (that is, the second seal member is non-defective), the oil recycling hole is opened and the plunger is further inserted in the body.

When the first seal member is located at a predetermined position in the body where it is in contact with the slidable portion (inner surface) of the body but the oil recycling hole has not reached the second seal member, the internal air tightness of the lash adjuster (or air tightness of the high-pressure chamber and reservoir) depends on the sealability of both the first seal member and the second seal member installed between the slidable portions of the plunger and the body. More particularly, since the space defined by the first and second seal members is communicated with the reservoir via the oil recycling hole, the air tightness of the reservoir depends on the sealability of the first seal member, while the air tightness of the high-pressure chamber depends on the sealability of the first and second seal members.

In the second test performed under this condition, it becomes difficult to further supply the plunger with the pressurized gas via the oil injection port at the stage when the internal gas pressure of the lash adjuster has reached the pressure of the pressurized injection gas, provided that the internal air tightness of the lash adjuster is established, thereby verifying the sealability of the first and second seal members. This can be confirmed by a leak tester adapted to test air tightness of the lash adjuster. Since the sealability of the second seal member has been confirmed in the first test, the sealability of the first seal member is verified in the second test if no leak is detected by the leak tester for example.

On the other hand, if the internal air tightness of the lash adjuster were not secured, the pressurized gas would be indefinitely supplied to the plunger due to the fact that the pressurized gas would continuously leak from the slidable portions of the body and plunger, as confirmed by the leak tester.

Incidentally, in the case where the internal air tightness of the lash adjuster is not secured (that is, the first seal member is defective), the plunger is pulled up to a predetermined position (for example the position where the first test was finished) for replacement of the first seal member. The second test will be repeated after the replacement. Replacement of the first seal member and a subsequent second test will be repeated until the replaced first seal member is confirmed to be satisfactory.

Result of the Invention

As will be apparent from the foregoing description, the air tightness test of a sealed lash adjuster as defined in claim 1 can verify the sealability of the first and second seal members by testing the internal air tightness of the lash adjuster in the process of assembling the lash adjuster of interest by replacing the first and/or second seal member(s) as needed, thereby greatly improving the manufacturing yield of sealed lash adjusters.

BEST MODE FOR CARRYING OUT THE INVENTION

The invention will now be described in detail by way of example with reference to the accompanying drawings.

Figure 1:
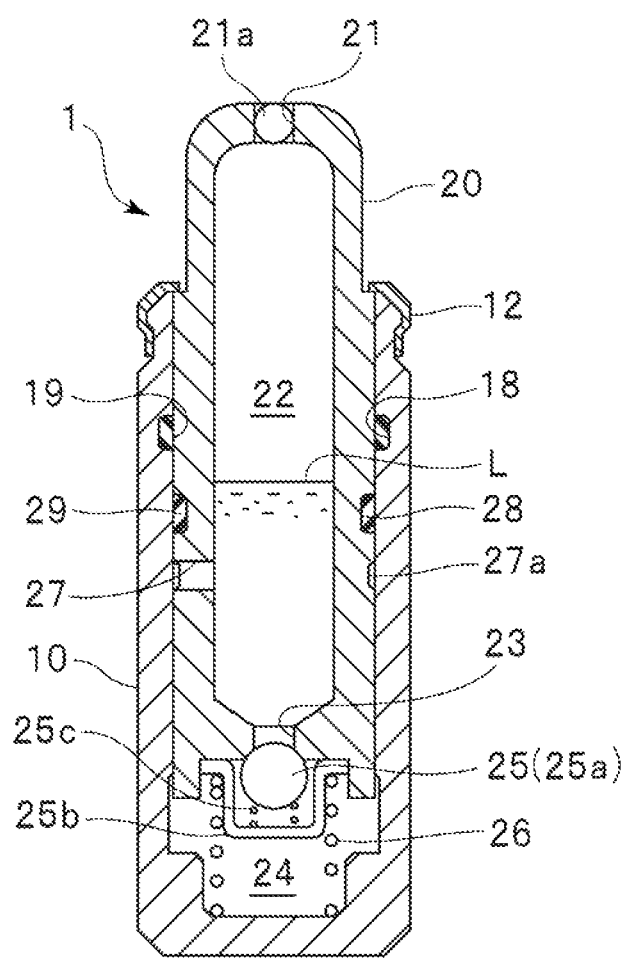
FIG. 1 is a longitudinal cross section of a sealed lash adjuster in accordance with a first embodiment of the invention.

Referring to FIG. 1, there is shown a sealed lash adjuster 1 (hereinafter simply referred to as lash adjuster) in accordance with an embodiment of the invention. The sealed lash adjuster 1 has a cylindrical plunger 20 having an open lower end and slidably inserted in a cylindrical body 10 having an open upper end and a bottom, the cylindrical plunger 20 being slidable in the axial direction and in the circumferential direction of the cylindrical body 10. Formed in the cylindrical plunger 20 is a reservoir 22, which is communicated with a high-pressure chamber 24 provided below the cylindrical plunger 20 via a communication hole 23 formed in the lower end of the cylindrical plunger 20. Reference numeral 12 indicates a cap retainer for controlling the length of the cylindrical plunger 20 projecting from the cylindrical body 10. Reference numeral 25 indicates a check valve, which includes a check ball 25a engaging with the communication hole 23 defined by the plunger 20, a ball cage 25b press-fitted in a recess formed in the lower end of the cylindrical plunger 20, and a check ball spring 25c, provided between the check ball 25a and the ball cage 25b, for urging the 25a towards the communication hole 23 to close the communication hole 23. The reservoir 22 of the lash adjuster is charged with oil (silicon oil for example) L injected from an oil injection port 21 formed in the top end of the cylindrical plunger 20. The oil is charged in the reservoir to a predetermined height. Reference numeral 21a indicates a ball plug, press-fitted in the oil injection port 21, for encapsulating the oil L and gas in the reservoir 22. Reference numeral 26 indicates a plunger spring provided between the ball cage 25b and the bottom of the cylindrical body 10. In the process of assembling the sealsed lash adjuster having the first and second seal members, the check valve 25 (check ball 25a) is adapted to open the communication hole 23 when the cylindrical plunger 20 is pushed upward by the plunger spring 26, thereby allowing the oil to flow from the reservoir 22 to the high-pressure chamber 24, but adapted to close the communication hole 23 to shut down the reverse flow of oil.

Formed in the side wall of the cylindrical plunger 20 is an oil recycling hole 27 for returning the oil from the high-pressure chamber 24 to the reservoir 22 via the slidable portions of the cylindrical plunger 20 and cylindrical body 10. Formed in the outer periphery of the cylindrical plunger 20 and at the level of the oil recycling hole 27 is a circumferential groove 27a extending in the direction perpendicular to the oil recycling hole 27 to secure smooth flow of oil through the reservoir 22. It is noted that the oil recycling hole 27 is located such that it is always lower than the level of the oil in the reservoir 22 when the lash adjuster is in use.

In order to prevent engine oil from entering the lash adjuster through the slidable portions of the cylindrical plunger 20 and cylindrical body 10, and to prevent the oil from leaking from the lash adjuster, seal members 19 and 29 (in the form of rubber or resin rings) serving as seal means are provided at two axial positions between the open end of the cylindrical body 10 and the oil recycling hole 27. The first seal member 29 closer to the oil recycling hole 27 mainly functions to prevent the oil from leaking from the sealed lash adjuster, while the second seal member 19 closer to the open end of the cylindrical body 10 functions to prevent engine oil from entering the lash adjuster.

More particularly, the first seal member 29 is mounted in a groove 28 formed in the sliding portion (outer periphery) of, and near the oil recycling hole 27 of, the cylindrical plunger 20 so that the seal member is in sliding contact with the slidable portion (inner surface) of the body 10, while the second seal member 19 is mounted in a groove 18 formed in the slidable portion (inner circumference) of, and near the open end of, the cylindrical body 10 so that the seal member is in sliding contact with the slidable portion (outer periphery) of the cylindrical plunger 20.

Thus, the first seal member 29 and second seal member 19 are disposed between the respective slidable portions of the plunger 20 and body 10 such that the space defined by the first and second seal members 29 and 19, respectively, is expanded when the plunger 20 is pushed in the body 10, but contracted when the plunger 20 is projected from the body 10.

Figure 2:
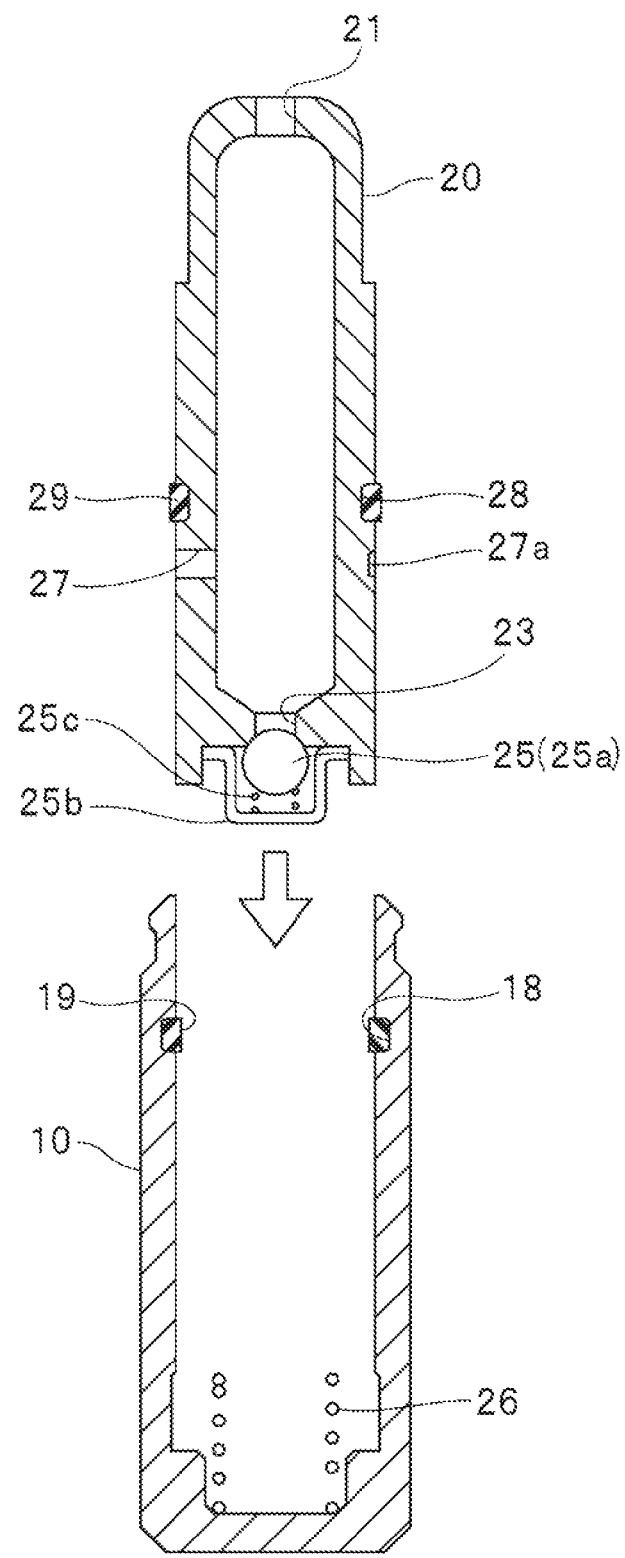
FIG. 2 is a longitudinal cross section of the body and plunger of the lash adjuster before the sealed lash adjuster is assembled.

In assembling the lash adjuster in a manner as shown in FIG. 2, the second seal member 19 is installed in the groove 18 and the plunger spring 26 is installed in the body 10, and the first seal member 29 is mounted in the groove 28 from above (that is, from the upper open end of the body 10). The plunger 20 and a check valve 25 integrated together is inserted in the body until the recess (check ball 25a) formed at the lower end of the plunger 20 reaches a predetermined position (FIG. 1) where the recess comes into engagement with the plunger spring 26. It is noted that in inserting the plunger 20 in the body 10, it is rather difficult to insert the plunger 20 in the body 10 since the communication hole 23 communicated with the reservoir 22 is closed by the check valve 25 (check ball 25a). To insert the plunger 20 in the body 10 without such difficulty, a thin stick is inserted from the oil injection port 21 into the reservoir 22 to push open the check valve 25 (check ball 25a) so as to open the communication hole 23.

Next, the cap retainer 12 is fitted onto the open end of the body 10 to prevent the plunger 20 from coming off the body 10. Finally, a predetermined amount of oil is injected into the lash adjuster through the oil injection port 21 formed in the upper end of the plunger 20, and the ball plug 21a is press-fitted in the oil injection port 21 to seal it.

Figure 4:
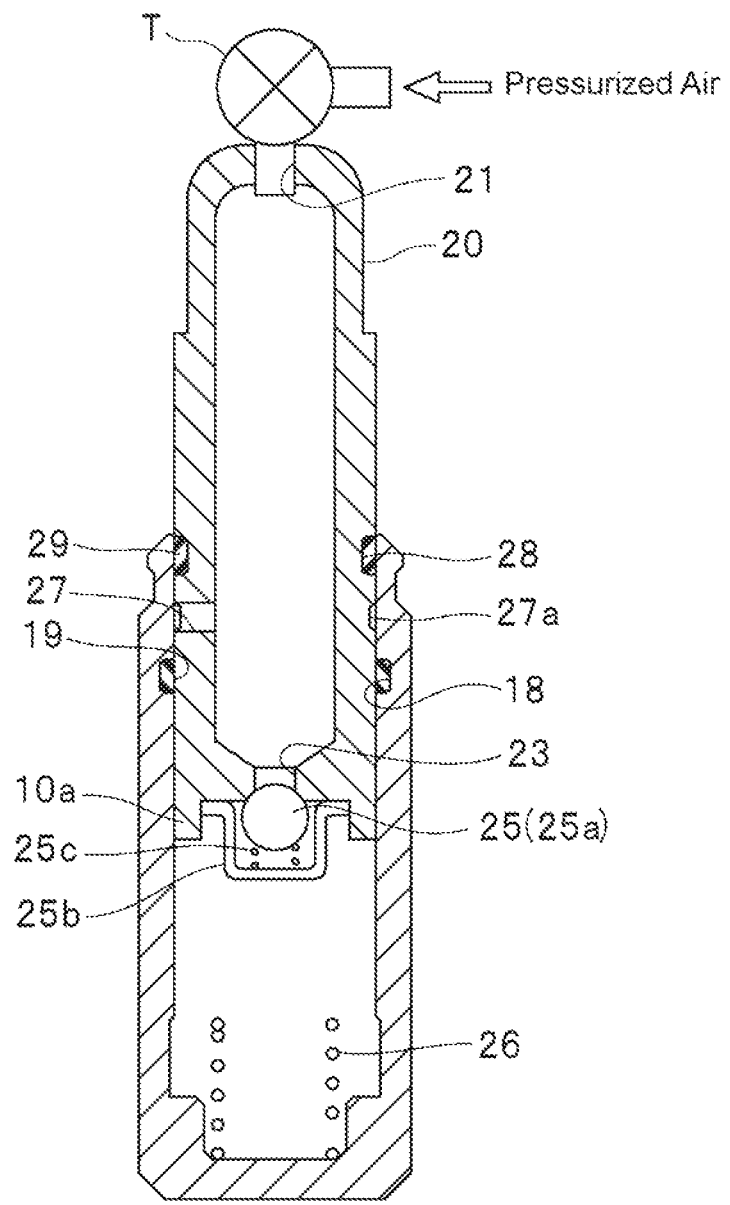
FIG. 4 illustrates how a second air tightness test is performed when the plunger is inserted in the body with the first seal member held in contact with the sliding portion of the body but the oil recycling hole held at a position not reaching the second seal member.

In the air tightness test in accordance with the embodiment of the present invention, the internal air tightness (or sealability of the first seal member 29 and second seal member 19) of the lash adjuster is tested in the process of assembling the lash adjuster by injecting pressurized air from the oil injection port 21 into the plunger 20 as shown in FIG. 4.

Figure 3:
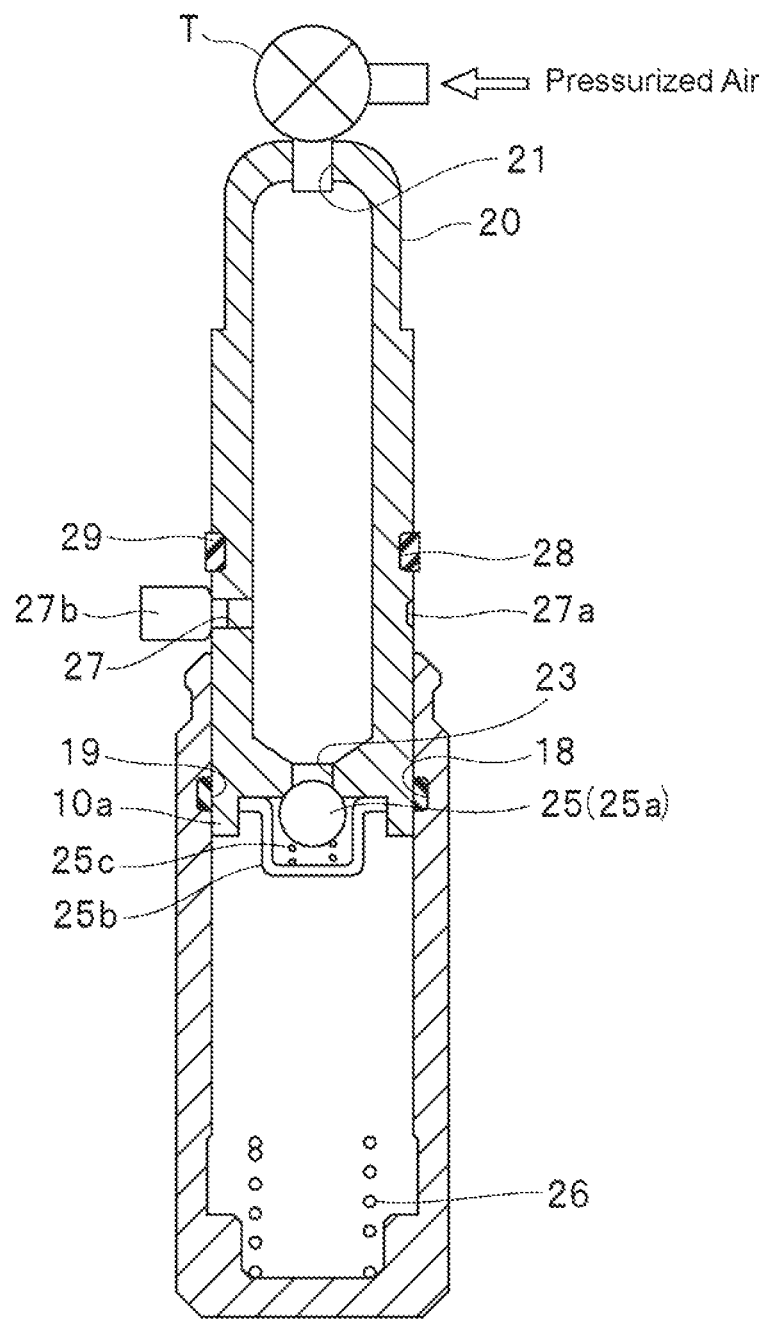
FIG. 3 illustrates how a first air tightness test is performed when the plunger is inserted in the body with the lower end of the plunger held in contact with the second seal member.

In the first step of the air tightness test as shown in FIG. 3, the plunger provided at the lower bottom thereof with the check valve 25 and with the first seal member 29 mounted on the outer periphery thereof is inserted from above into the body having therein the plunger spring 26 and the second seal member 19 on the inner circumference thereof until the lower end of the slidable portion of the plunger 20 comes into sliding contact with the second seal member 19 mounted on the body 10. At this stage, the oil recycling hole 27 is closed with a plug 27b, and a leak tester T is mounted in the oil injection port 21 formed in the top end of the plunger 20. Then, to test the internal air tightness of the adjuster, pressurized air is supplied to the plunger 20 via the leak tester T.

Under the condition shown in FIG. 3, where the oil recycling hole is closed, the internal air tightness of the lash adjuster (high-pressure chamber 24 and reservoir 22) depends on the sealability of the second seal member 19 provided between the slidable portions of the plunger 20 and body 10. In this configuration, when the pressure inside the lash adjuster has reached the pressure of the externally supplied air, it becomes difficult to further supply the plunger 20 with air via the leak tester T if the air tightness of the plunger 20 is established. Thus, the sealability of the slidable portions of the 20 and body 10, and hence the sealing performance of the second seal member 19, is verified by the leak tester T.

On the other hand, if the internal air tightness of the lash adjuster is not established, the pressurized air may be continuously and indefinitely supplied to the plunger 20, since then the air continues to leak from the plunger via the slidable portions of the body 10 and plunger 20. This leak can be confirmed with the leak tester T, thereby revealing the defective sealablity of the second seal member 19.

If the second seal member 19 is found to be defective, the plunger 20 is removed from the body 10 to replace the second seal member 19 with a new one. Then the first test is repeated after the new second seal member 19 is mounted in the groove 18. This first test procedure is repeated indefinitely until the sealability of the second seal member is verified.

If in the first test the internal air tightness of the lash adjuster is verified, the leak tester T and the plug 27b are removed, and the plunger 20 is further inserted in the body 10 for the second test as shown in FIG. 4.

In the second test shown in FIG. 4, the plunger 20 is inserted in the body until the first seal member 29 reaches a predetermined position where the seal member is in sliding contact with the inner surface of the body 10 but the oil recycling hole 27 has not reached the second seal member 19 mounted on the body 10 (FIG. 4), At this stage, the leak tester T is mounted in the oil injection port 21 and pressurized air is supplied to the plunger 20 via the leak tester T to test the internal air tightness of the lash adjuster.

Under the condition shown in FIG. 4, where the oil recycling hole 27 is located between the second seal member 19 and first seal member 29 in the body 10, the internal air tightness of the lash adjuster (that is, air tightness of the high-pressure chamber 24 and reservoir 22) is established by the sealabilty of the second seal member 19 and first seal member 29 provided between the slidable portions of the plunger 20 and body 10. More particularly, the air tightness of the reservoir 22 depends on the sealability of the first seal member 29 since the space between the slidable portions defined by the first seal member 29 and second seal member 19 is communicated with the reservoir 22 via the oil recycling hole 27, while the air tightness of the high-pressure chamber 24 depends on the sealability of the second seal member 19 and first seal member 29.

In supplying pressurized air to the plunger 20 under this condition, it becomes difficult to supply air to the plunger 20 when the internal pressure of the lash adjuster has reached the pressure of the externally supplied air, provided that the internal air tightness of the lash adjuster is secured, as verified by the leak tester T. Thus, the sealablity of the slidable portions of the body and plunger 20 is established. This in turn verifies the sealability of the first seal member 29 and second seal member 19. Furthermore, this verifies good sealability of the first seal member 29, since the sealability of the second seal member 19 has been confirmed satisfactory in the first test.

On the other hand, if the internal air tightness is not established, the pressurized air is indefinitely supplied (due to the fact that the air leaks from the plunger via the slidable portions of the body 10 and plunger 20), so that the leak tester T will detects the leak. Thus, the first seal member 29 will be detected to be defective in sealability.

In the second test as shown in FIG. 4, in the case where the internal air tightness is not secured (due to the defective sealability of the first seal member 29), the plunger 20 is pulled up to a location in the body 10 where the first seal member 29 can be replaced with a new one before the second test is resumed. This second test will be repeated indefinitely until a replaced first seal member is confirmed satisfactory in sealability.

Since the first and second seal members 29 and 19 are tested for required sealability and replaced by satisfactory one(s) as needed in the process of assembling the lash adjuster, the yield ratio of the sealed lash adjuster is greatly improved by the inventive air tightness test.

NOTATIONS 1 lash adjuster
10 body
18 groove formed in the plunger
19 second seal member
20 plunger
21 oil injection port
22 reservoir
23 communication hole
24 high-pressure chamber
25 check valve
27 oil recycling hole
28 groove formed in the body
29 first seal member
T leak tester

What is claimed is:

1. A method of testing air tightness of a sealed lash including: a cylindrical body having an upper open end and a bottom; a cylindrical plunger inserted in the body and having a lower open end and a reservoir formed therein; a check valve, provided at the lower end of the plunger, for communicating the reservoir with a high-pressure chamber provided below the plunger; an oil recycling hole formed in the side wall of the plunger for returning oil from the high pressure chamber to the reservoir; and seal means in the form of a first and a second seal member provided on the slidable portions of the plunger and the body in slidable contact with each other and at two axial locations between the open end of the body and the oil recycling hole, with the first seal member provided on the slidable portion of the plunger and the second seal member provided on the slidable portion of the body, the testing method adapted to test the air tightness of the sealed lash adjuster, in the course of assembling the sealed lash adjuster by supplying the plunger with pressurized gas through an oil injection port formed in the top end of the plunger such that the space defined by the first and second seal members is expanded when the plunger is pushed in the body, and that the space is contracted when the plunger is projected from the body, the method characterized by comprising:

a first step of testing the air tightness of the lash adjuster (the step referred to as first test) by closing the oil recycling hole when the lower end of the slidable portion of the plunger inserted in the body has reached a predetermined position where the plunger is in sliding contact with the second seal member; and a second step of testing the air tightness of the lash adjuster (the step referred to as second test) performed if a determination is made in the first test that the lash adjuster has normal air tightness, the second test including a process of opening the oil recycling hole and further inserting the plunger to a predetermined position in the body where the first seal member is in contact with the slidable portion of the body but the oil recycling hole has not reached the second seal member, and then testing internal air tightness of the lash adjuster.

* * * * *